US011954037B2

United States Patent
Sharma et al.

(10) Patent No.: US 11,954,037 B2
(45) Date of Patent: Apr. 9, 2024

(54) MEMORY ADDRESS ALLOCATION AND CACHE MAPPING TO RETAIN DATA IN CACHE

(71) Applicant: NVIDIA Corporation, Santa Clara, CA (US)

(72) Inventors: Ankit Sharma, Dublin, CA (US); Shridhar Rasal, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 59 days.

(21) Appl. No.: 17/668,803

(22) Filed: Feb. 10, 2022

(65) Prior Publication Data

US 2023/0251971 A1 Aug. 10, 2023

(51) Int. Cl.
*G06F 12/0873* (2016.01)
*G06F 12/0868* (2016.01)
*G06F 12/0871* (2016.01)

(52) U.S. Cl.
CPC ...... *G06F 12/0873* (2013.01); *G06F 12/0868* (2013.01); *G06F 12/0871* (2013.01); *G06F 2212/1044* (2013.01)

(58) Field of Classification Search
None
See application file for complete search history.

(56) References Cited

U.S. PATENT DOCUMENTS

| 8,738,860 B1* | 5/2014 | Griffin | G06F 12/0897 711/122 |
| 11,221,944 B1* | 1/2022 | Wang | G06F 3/064 |
| 2015/0356024 A1* | 12/2015 | Loh | G06F 12/1054 711/113 |
| 2019/0004941 A1* | 1/2019 | Genshaft | G06F 12/0246 |
| 2019/0042464 A1* | 2/2019 | Genshaft | G06F 12/0864 |
| 2021/0405914 A1* | 12/2021 | Lam | G06F 3/0679 |

OTHER PUBLICATIONS

"Contiguous Memory Allocation," Techopedia, Sep. 9, 2020, retrieved from: https://www.techopedia.com/definition/3769/contiguous-memory-allocation, 7 pages.
(Continued)

*Primary Examiner* — Charles Rones
*Assistant Examiner* — Ryan Dare
(74) *Attorney, Agent, or Firm* — Lowenstein Sandler LLP

(57) ABSTRACT

A computing system includes a volatile memory, a cache coupled with the volatile memory, and a processing device coupled with the cache and at least one of a storage device or a network port. The processing device is to: generate a plurality of virtual addresses that are sequentially numbered for data that is to be at least one of processed or transferred in response to an input/output (I/O) request; allocate, for the data, a continuous range of physical addresses of the volatile memory; generate a set of hash-based values based on mappings between the plurality of virtual addresses and respective physical addresses of the continuous range of physical addresses; identify a unique cache line of the cache that corresponds to each respective hashed-based value of the set of hash-based values; and cause the data to be directly stored in the unique cache lines of the cache.

21 Claims, 7 Drawing Sheets

(56) References Cited

OTHER PUBLICATIONS

Grunwald et al., "Improving the Cache Locality of Memory Allocation," Association for Computing Machinery, Alburquerque, NM, 1993, 177-186 pages.

Gupta, M, "Difference between Contiguous and Noncontiguous Memory Allocation," GeeksforGeeks, Jun. 1, 2021, retrieved from: https://www.geeksforgeeks.org/difference-between-contiguous-and-noncontiguous-memory-allocation/, 6 pages.

Herter et al, "CAMA: A Predictable Cache-Aware Memory Allocator," 23rd Euromicro Conference on Real-Time Systems, 2011, 23-32 pages.

Nazarewicz, M, "Continuous Memory Allocator—Allocating big chunks of physically contiguous memory," Nov. 6, 2012, retrieved from: https://events.static.linuxfound.org/images/stories/pdf/lceu2012_nazarwicz.pdf, 46 pages.

\* cited by examiner

MEMORY ADDRESS ALLOCATION AND CACHE MAPPING TO RETAIN DATA IN CACHE

TECHNICAL FIELD

At least one embodiment pertains generally to computer systems, and more specifically, but not exclusively, to improving a memory address allocating and cache mapping to retain data in cache.

BACKGROUND

Solid-state drives (SSDs) are mass-storage devices that use integrated circuit memory, typically negative-AND (NAND)-based flash memory, to store data while providing an interface that emulates traditional hard disk drives (HDDs). By comparison with HDDs, SSDs offer faster access, lower latency, and greater resistance to environmental disturbances. Therefore, SSDs are gradually replacing HDDs in many storage applications.

Because SSDs were originally designed to take the place of HDDs, they have generally used the same sorts of input/output (I/O) buses and protocols as HDDs, such as Serial AT Attachment (SATA), Serial Attached Small Computer System Interface (SCSI) (SAS) and Fibre Channel. Subsequently, SSDs have become available that connect directly to the peripheral component interface bus of a host computer, such as the PCI Express® (PCIe®) bus. NVM Express (NVMe) defines a register interface, command set and feature set for PCI Express SSDs.

Advanced network interface controllers (NICs) are designed to support remote direct memory access (RDMA) operations, in which the NIC transfers data by direct memory access from the memory of one computer into that of another computer without involving the central processing unit (CPU) of the target computer. These RDMA operations are generally used to transfer data to/from host memory, e.g., random access memory (RAM), although attempts have been made to adapt RDMA functionality for reading/writing data directly to or from an SSD.

Additionally, smart NICs, such as the NVIDIA® BlueField® data processing unit (DPU), and graphics processing units (GPUs), offload critical network, security, and storage tasks from a CPU, for example, by supporting RDMA operations and directly reading or writing to attached storage devices in response to remote initiators requests. Further, smart NICs (and GPUs) involve high data transfer applications that may still involve RAM as a primary storage for temporary data. Cache pinning is not implemented in all systems or, in systems that support cache pinning, finding the pinning address is a challenge and pinning of the entire cache may not allow other processes to work properly. Further, cache pinning is not fully effective with respect to the amount of allocation needed for data transfer with optimal balance of needed pinning versus not needed pinning. The result is that, in smart NICs (or similar communication apparatus or device), cache can fill up and need to undergo evictions to RAM to complete certain operations. These cache evictions cause a bottleneck in such high-speed, high-data-volume NICs (or GPUs) due to the latencies involved in cache eviction to the RAM within the NICs/GPUs being greater than communication device or storage device latencies.

BRIEF DESCRIPTION OF DRAWINGS

Various embodiments in accordance with the present disclosure will be described with reference to the drawings, in which.

DETAILED DESCRIPTION

Figure 1A:
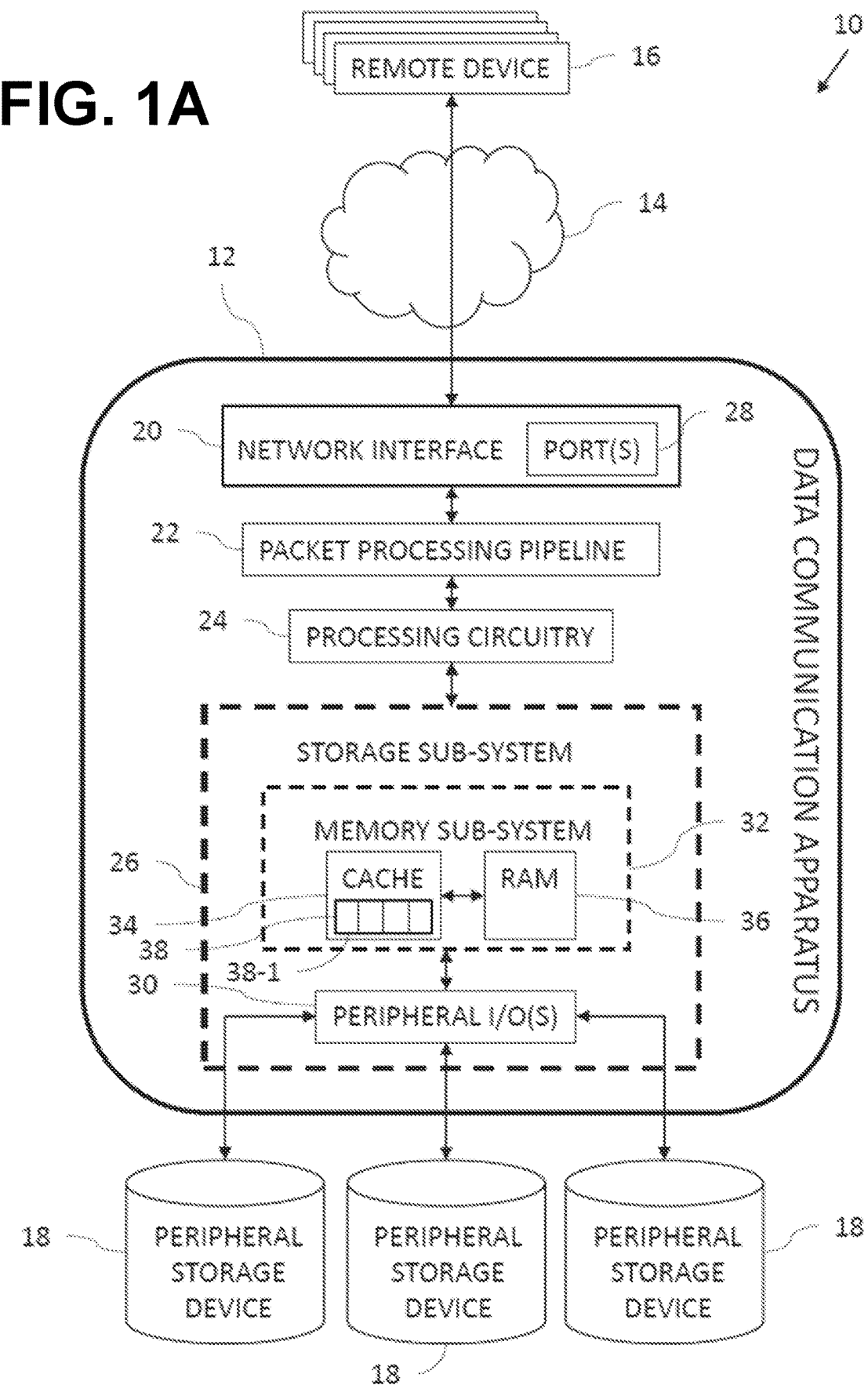
FIGS. 1A-1B are schematic block diagrams of a data communication system, in accordance with at least some embodiments.

Aspects and embodiments of the present disclosure address the above mentioned bottleneck issues with evictions from cache to volatile memory such as RAM in smart NICs or similar apparatus or device (e.g., GPU) that supports high-speed and volume data transfer applications. In the various embodiments disclosed herein, the need for evictions may be either eliminated or significantly reduced by allocating a continuous range of physical addresses of volatile memory that is mapped to virtual addresses (VAs) of data that is one of being processed or transferred in response to an input/output (I/O) request, as will be explained in detail.

As previously mentioned, some data communication devices such as smart NICs (e.g., Mellanox® BlueField® DPU) support directly reading or writing to attached local peripheral storage devices (e.g., NVM express (NVMe) drives or other storage devices) via a storage sub-system in response to remote initiator requests (e.g., content transfer requests received from devices over a network to which the data communication device is connected). Depending on the level of content transfer requests and the speed and bandwidth of the network, storage sub-system interfaces and the local peripheral storage devices, the storage sub-system may suffer from congestion leading to a deterioration in system response to serving the incoming content transfer requests.

For example, the storage sub-system may include a random-access memory (RAM) (e.g., Double Data Rate (DDR) memory) which is used to transfer content between the data communication device and the local peripheral storage devices, and vice-versa. In some cases, the RAM is not the bottleneck as the local peripheral storage devices are slow. In other cases, where the peripheral storage devices are fast enough (e.g., NVMe drives), the RAM may become the bottleneck as it is slower than the local peripheral storage devices and the network ports serving the initiators of the content transfer requests.

One method to solve this problem is to use a cache (e.g., last-level cache (LLC)) in which to copy data between the data communication device and the local peripheral storage devices, and vice-versa. However, if the cache becomes full, cache entries (which still need to be used) may be evicted to the RAM, for example, on a least recently used (LRU) basis. The evicted entries are then read from RAM to the cache, when necessary, leading to a bottleneck. In general, the cache may be selected to service the network bandwidth and if the data communication device is successful in keeping all entries (that need to be used) in the cache, then the cache may service the content transfer requests at full wire speed. However, once entries are evicted from the cache to the RAM, a vicious cycle may be formed in which it may take a long time to return to optimal performance where no entries (that need to be used) are evicted from the cache.

Therefore, in some cases, if all received content transfer requests are served despite not having sufficient room in the cache, the cache becomes a bottleneck and cache entries (which still need to be used) are evicted to RAM. One solution is to request initiators to refrain from sending content transfer or I/O requests. However, this solution is generally not practical as initiators may be from different entities or otherwise non-compliant.

Accordingly, as per various embodiments, this cache eviction bottleneck is removed or significantly reduced by processing logic (e.g., circuitry, firmware, software, or a combination thereof of the data communication device) generating virtual addresses that are sequentially numbered for data that is to be processed/transferred in response to an I/O request. The processing logic may further allocate, for the data, a continuous range of physical addresses of the volatile memory (e.g., RAM). Once such a continuous range of physical addresses is allocated, according to these embodiments, the processing logic generates a set of hash-based values based on either the respective physical addresses or based on mappings between the virtual addresses and respective physical addresses of the continuous range of physical addresses. These hash-based values, which may be stored in a table for example, may be used to identify a unique cache line of the cache (such as the LLC) that corresponds to each respective hashed-based value of the set of hash-based values. The processing device ultimately causes the data to be directly stored in the unique cache lines of the cache, retaining the unique cache line mappings with the virtual addresses.

In these embodiments, because the processing device may further limit the continuous range of physical addresses (PAs) to a size of the cache, no eviction need occur as to this data because there will be no conflicts between any given virtual address and a corresponding unique cache line that has been assigned as described above. After this initial data is processed and transferred, further data may be similarly processed with an allocation to the continuous range of physical addresses or to another similarly-sized continuous range of physical addresses. If the continuous range of physical addresses is reallocated to a different range, then the processing device may update the set of hash-based values accordingly so that the virtual addresses still map to unique cache lines of the cache. This cache, or LLC, may generally be understood as the farthest level of cache from the processing logic of the data communication device.

Therefore, advantages of the systems and methods implemented in accordance with some embodiments of the present disclosure include, but are not limited to, removing the necessity for evictions between the LLC and volatile memory (RAM) as well as the related necessity for reading data out of the volatile memory, reducing the latency involved with the previously mentioned cache-RAM bottleneck. Other advantages will be apparent to those skilled in the art of memory sub-systems discussed hereinafter.

Figure 1B:
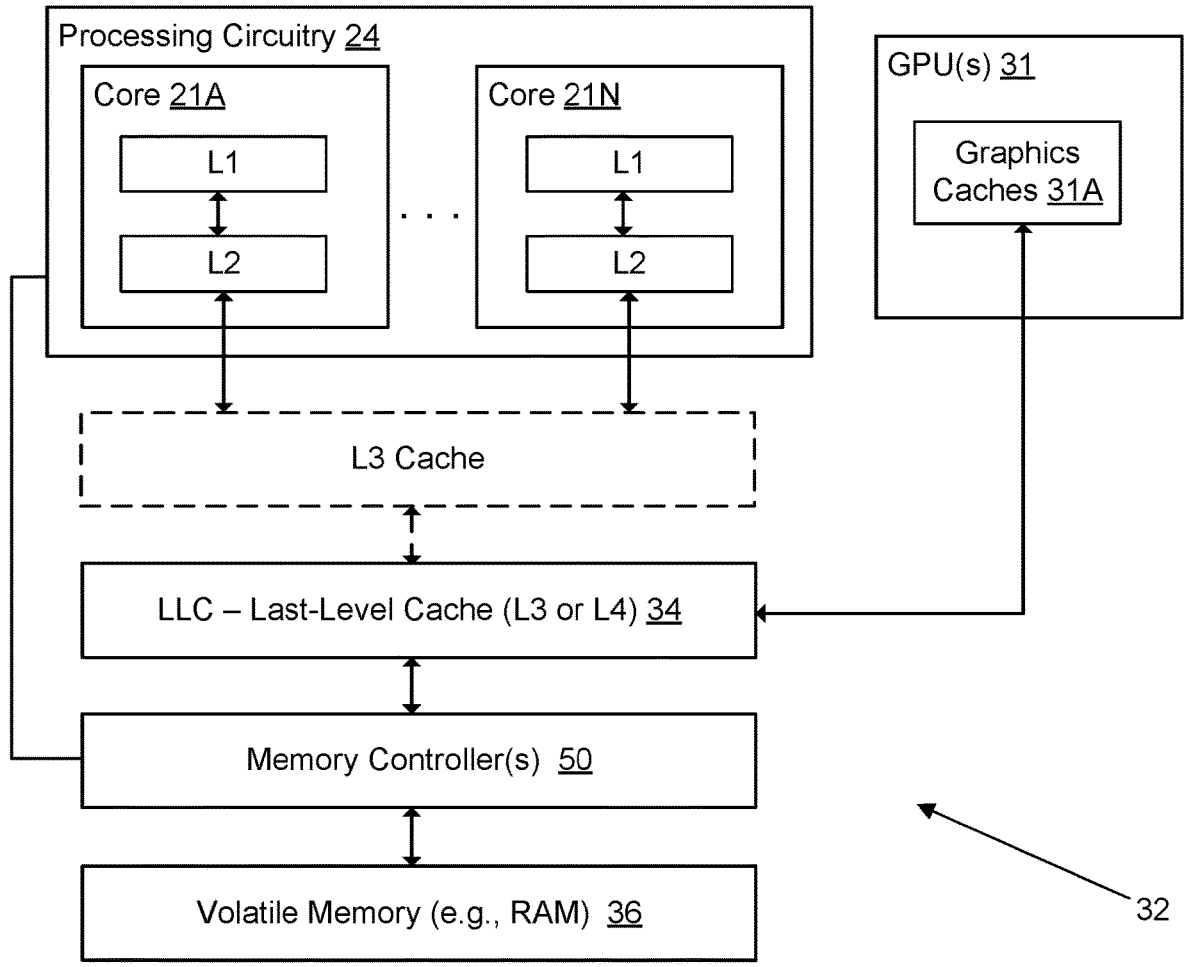

FIGS. 1A-1B are schematic block diagrams of a data communication system 10, in accordance with at least some embodiments. The data communication system 10 includes data communication apparatus 12, e.g., a computing system or device, which receives content transfer requests over a packet data network 14 from one or more remote devices 16. The content transfer requests may be RDMA or other I/O requests by way of example only. In response to the content transfer requests, the data communication apparatus 12 reads data from, and/or writes data to, (local peripheral) storage devices 18 (e.g., NVMe drives) coupled with the data communication apparatus 12. For example, the data communication apparatus 12 is configured to receive data from the remote device(s) 16 to be written to the local peripheral storage device(s) 18 and/or send data read from the local peripheral storage device(s) 18 to the remote device(s) 16. In some embodiments, the remote device(s) 16 are storage disks, networks, CPUs, GPUs, or the like.

In various embodiments, the data communication apparatus 12 includes a network interface 20, a packet processing pipeline 22, processing circuitry 24, and a storage sub-system 26. The network interface 20 includes one or more network ports 28 for connection to the packet data network 14. The packet processing pipeline 22 is configured to process received network packets and to process data for sending in packets over the network 14. The packet processing pipeline 22 may include a physical layer (PHY) chip and a medium access control (MAC) chip, among other components.

The processing circuitry 24 may further process received packet data for example, received content transfer requests or I/O requests. The processing circuitry 24 may comprise one or more processors or processor cores, for example, tile processors, or an array of ARM processor cores, or the like. The functionality of the processing circuitry 24 is described in more detail with reference to FIGS. 2-6 below, and may also be referred to as a processing device, which can optionally also include the packet processing pipeline 22 in some embodiments.

In practice, some or all of the functions of the processing circuitry 24 may be combined in a single physical component or, alternatively, implemented using multiple physical components. These physical components may comprise hard-wired or programmable devices, or a combination of the two. In some embodiments, at least some of the functions of the processing circuitry 24 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The storage sub-system 26 includes a memory sub-system 32 and one or more peripheral interfaces 30. The storage sub-system 26 is configured to be connected to the local peripheral storage devices 18 via the peripheral interface(s) 30, for example, PCIe interfaces. The memory sub-system 32, which is described in more detail with reference to FIG. 1B, includes a cache 34 and a random-access memory (RAM) 36. The memory sub-system 32 is configured to evict overflow from the cache 34 to the RAM 36. Data is read by the local peripheral storage devices 18 and written by the local peripheral storage devices 18 via the cache 34 and the peripheral interfaces 30.

For example, while serving a particular content transfer request, the data written to, or read from, one of the local peripheral storage devices 18 is transferred via a section 38 of the cache 34. The same section 38 (e.g., the same cache line or same cache lines) of cache 34 may be used to transfer several data chunks associated with the same content transfer request one after the other. For example, a first data chunk of a content transfer request is read from one of the local peripheral storage devices 18 to the section 38-1 of the cache 34, and then copied from the section 38-1 of the cache 34 to the packet processing pipeline 22 for sending over the network 14 to the initiator of the content transfer request, then a second data chunk of that content transfer request is read from the same local peripheral storage devices 18 to the same section 38-1 of the cache 34, and then copied from that section 38-1 of the cache 34 to the packet processing pipeline 22 for sending over the network 14 to the initiator of the content transfer request, and so on. In other embodiments, different sections 38 of the cache 34 may be used to transfer different chunks associated with the same content transfer request.

With additional reference to FIG. 1B, according to at least some embodiments, the processing circuitry 24 includes multiple processing cores 21A . . . 21N, where each processing core includes multiple levels of on-chip cache. For example, a first-level (L1) cache can include both data cache and instruction cache, and a second-level (L2) cache may be fast-access memory near the L1 cache, but larger than the L1 cache. In some embodiments, an additional level of cache (L3 cache) is optionally located on each processing core. These levels of on-chip cache may be implemented, for example, using fast-access static random access memory (SRAM).

The off-chip cache, referred to as the cache 34 herein, may be understood to be the last-level cache (LLC), or the cache that is farthest from the processing circuity 24. Although typically the LLC is L3 cache, in embodiments where there is an additional fourth-level (L4) cache in the memory sub-system 32, the LLC is L4 cache and the L3 cache (illustrated in a dashed box) is positioned between the L2 on-chip cache and the L4, or LLC, cache 34. This LLC (or cache 34) will also be referred to herein as the farthest level of cache from the processing circuitry 24 (or processing device). The L3 (or L2) cache, whichever is the second-to-last-level cache in the memory sub-system 32, may be referred to herein as the second-farthest level of cache from the processing circuitry 24 (e.g., processing device) for clarity to be distinguished from the cache 34.

In these embodiments, as illustrated in FIG. 1B, the data communication system 10 further includes one or more graphics processing units (GPUs) 31, which includes graphics caches 31A, also having access to the cache 34. In these embodiments, the memory sub-system 32 further includes one or more memory controllers 50 (or MCs) for controlling access to the volatile memory, e.g., the RAM 36 previously discussed. This RAM 36 is typically dynamic RAM (DRAM), but may be another type of volatile memory. The memory controllers 50 may be configured to assign and/or translate virtual addresses (VAs) and/or cache lines associated with data that is stored in the cache 34 to physical addresses (PAs) of the RAM 36. In this way, the memory controllers 50 coordinate the eviction process, and coherently track data stored in the cache 34 with data stored in the RAM 36, thus offloading this work from the processing circuitry 24. Thus, according to at least some embodiments, the processing circuitry 24 can determine, with the help of the memory controllers 50, a continuous range of physical addresses within the RAM 36 to which to map the virtual addresses of any data associated with I/O (or content transfer) requests, which are discussed herein.

Figure 2:
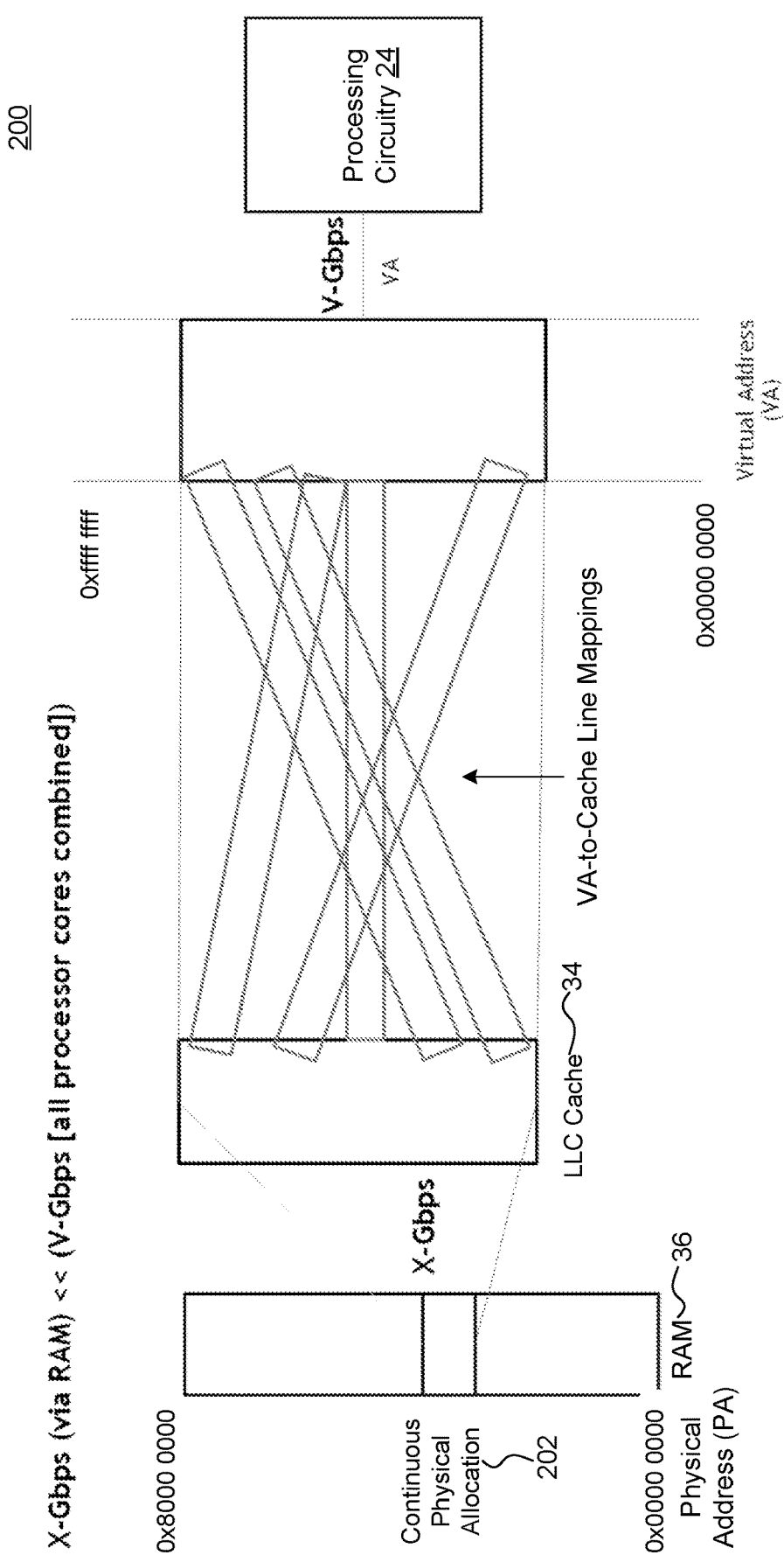
FIG. 2 is an operative block diagram illustrating hash-based allocation between virtual addresses (VAs) and a continuous range of physical addresses (PAs) in volatile memory in order to map the VAs to unique cache lines in a last-level cache (LLC), in accordance with at least some embodiments.

FIG. 2 is an operative block diagram 200 illustrating hash-based allocation between virtual addresses (VAs) and a continuous range of physical addresses (PAs) in volatile memory (or RAM) in order to map the VAs to unique cache lines in a last-level cache (LLC), in accordance with at least some embodiments. As illustrated, the X-Gbps (where "Gbps" is "gigabits per second") speed for cache-to-RAM or RAM-to-cache data movement is much slower («) than the V-Gpbs speed of all of the processing cores combined, which creates the aforementioned bottleneck in accessing the volatile memory, which is illustrated as the RAM 36 for simplicity of explanation in the present embodiments In these embodiments, the processing device (e.g., to include at least the processing circuitry 24), generates virtual addresses (VAs) that are sequentially numbered for data that is to be at least one of processed or transferred in response to an input/output (I/O) request. The processing device may further allocate a continuous range of physical addresses 202 of the volatile memory. Once this continuous range of physical addresses 202 is allocated for the VAs, the processing device may further generate a set of hash-based values based on taking a hash of either the respective physical addresses (PAs) of the continuous range of physical addresses 202 or on mappings between the virtual addresses (VAs) and respective physical addresses of the continuous range of physical addresses 202. Taking a hash may be understood as performing a hash algorithm on each respective PA or on a combination of each respective PA and a corresponding VA to which the respective PA is mapped. The hash-based values that are generated ensure that hits on any given cache line do not overlap between virtual addresses.

Once the set of hash-based values is generated, the hash-based values may be stored in a table or other data structure for future reference. In these embodiments, the processing device may further identify a unique cache line of the cache 34 that corresponds to each respective hashed-based value of the set of hash-based values. In this way, a corresponding mapping between each sequentially-numbered VA is mapped to a unique cache line without any conflicts between the VAs mapping onto unique cache lines.

In disclosed embodiments, to ensure the uniqueness of the cache mapping based on the set of hash-based values, the processing device may further limit the continuous range of physical addresses 202 allocated to the virtual addresses to a size of the cache 34, e.g., the LLC. In this way, there are sufficient cache lines for the virtual addresses without the virtual addresses having to share any of the cache lines.

Further, the allocation of the continuous range of physical addresses 202 may be non-coherent allocation, and thus the processing device may execute DMA instructions that ensure coherency in cache and RAM accesses. Non-device-related data, e.g., data that is related to applications of the data communication apparatus 10, would typically be managed non-coherently in various embodiments.

Additionally, in various embodiments, a size of the continuous range of physical addresses 202 may be made to match a maximum possible size of any I/O request, e.g., 64 KB, 128 KB, 256 KB, or the like. Thus, the size of even the largest I/O request may be handled by a size of the continuous physical allocation of the physical addresses matching the size of the cache 34. This matching of the allocation of the continuous range of physical addresses 202 to the maximum possible size of I/O requests ensures that incoming I/O (or content transfer) requests do not cause the mapping of any cache line of the cache 34 to conflict with the mapping of another cache line.

Figure 3:
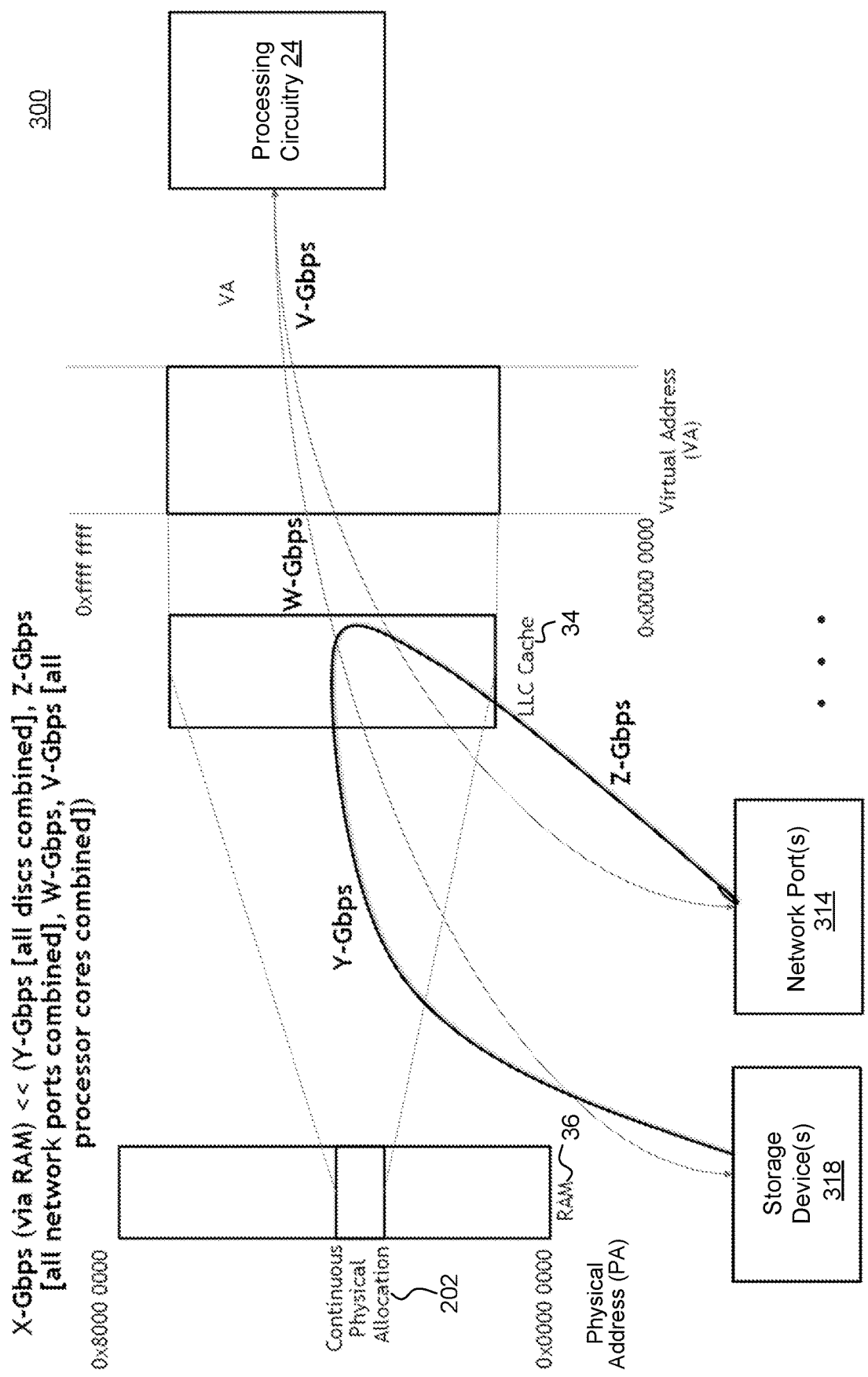
FIG. 3 is an operative data flow diagram in which data of the data communication system is routed directly through cache from storage device(s) and/or network port(s), without evicting data to volatile memory, based on the hash-based allocation of FIG. 2, in accordance with at least some embodiments.

FIG. 3 is an operative data flow diagram 300 in which data of the data communication system 10 is routed directly through cache 34 from storage device(s) 318 and/or network port(s) 314, without evicting data to volatile memory, based on the hash-based allocation of FIG. 2, in accordance with at least some embodiments. In some embodiments, the storage device(s) 318 are at least one of the peripheral storage devices 18 or a storage device that is one of the remote devices 16 (FIG. 1A). In at least one embodiment, the storage devices 318 is a storage hub or a network switch that manages (or is configured to manage) multiple storage disks. In some embodiments, the network ports 314 are one or more of the network ports 28 (FIG. 1A) that connect to the packet data network 14, e.g., to send or receive data from one or more networks and/or one or more of the remote devices 16.

In at least some embodiments, the processing device (e.g., at least part of the processing circuitry 24) causes the data of the I/O (or content transfer) request to be directly stored in the unique cache lines of the cache 34, which were identified as explained with reference to FIG. 2. As explained, because the cache 34 has the capacity to store all of this data, transferring data to/from the cache 34 to/from the storage device(s) 318 or to/from the network port(s) 314 need not access the RAM 36, avoiding the latencies associated with evicting data from the cache 34 or retrieving the evicted data from the cache 34. Thus, the processing device may cause the data to be directly transferred from the cache 34 to at least one of the storage devices 318 or the network ports 314. Further, the processing device may further change the data stored in at least one of the unique cache lines of the cache 34 without evicting the data to the voltage memory (e.g., RAM 36).

In these embodiments, as illustrated in FIG. 3, the X-Gbps speed of data accesses at the RAM 36 is still significantly slower than any of: i) Y-Gbps of all of the storage device(s) 318 accesses combined; ii) the Z-Gbps of all of the network ports 314 accesses combined; iii) the W-Gbps of all of the cache 34 accesses combined; and iv) the V-Gbps of all of the processor cores accesses combined. For this reason, eliminating RAM accesses results in significant data speed and throughput performance gains of the data communication system 10.

In at least some embodiments, the processing circuitry 24 further executes a scheduler algorithm to allocate the continuous range of physical addresses 202 to a particular application or process, and frees up that continuous range of physical addresses 202 when completed, e.g., so that the processing circuitry 24 may allocate the same or a different continuous range of physical addresses to a new (or second) data that is to be at least one of processed or transferred in response to a second I/O request. In some embodiments, for example, the RAM 36 is partitioned into N partitions, each partition sized to function as, and be selectable for, the continuous range of physical addresses. If the allocation is to the same continuous range of physical addresses 202, then the processing circuitry 24 may assign the multiple virtual addresses to the second data while maintaining the set of hash-based values and cause the second data of similarly-sequenced VAs to be directly stored in the same unique cache lines of the cache 34.

Otherwise, in at least one embodiment, if allocating to a different continuous range of physical addresses for processing a subsequent I/O request, the processing circuitry 24 can generate a new set of hash-based values based on the new respective physical addresses or based on mappings between the multiple virtual addresses and the new respective physical address. This new (or different) set of hash-based values can then be employed to identify a unique cache line for each respective virtual address of the multiple virtual addresses, effectively generating a new set of VA-to-cache line mappings to be used to index the second data within the cache 34. These new VA-to-cache line mappings can then be used for an extended period of time unless there is a need, e.g., based on scheduling, to allocate a new continuous range of PAs.

In some embodiments, the processing circuitry 24 also executes the scheduler algorithm to also de-conflict various I/O (or content) transfer requests, prioritize certain requests over other requests, and otherwise ensure prioritized data gets handled first. For example, the data for particular threads or applications can be labeled differently depending on a level of priority, such as in packet headers of such data. Then, when I/O requests come in, the I/O requests can themselves also include priority indicators that aid the processing circuitry 24 in scheduling handling of multiple concurrent I/O requests.

Figure 4:
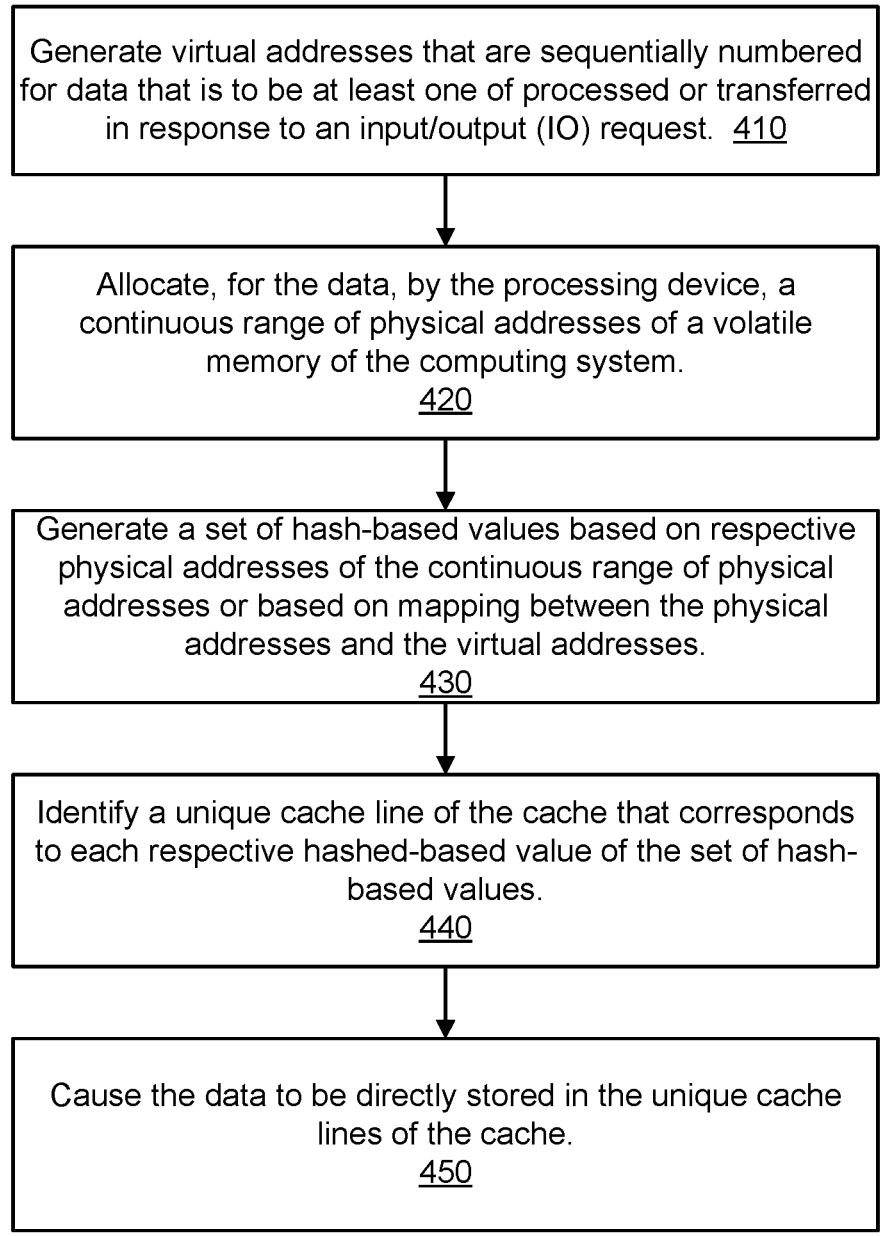
FIG. 4 is a flow diagram of a method for mapping VAs to the unique cache lines of FIG. 3 using the disclosed hash-based allocation, in accordance with at least some embodiments.

FIG. 4 is a flow diagram of a method 400 for mapping VAs to the unique cache lines of FIG. 3 using the disclosed hash-based allocation, in accordance with at least some embodiments. The method 400 may be performed by processing logic comprising hardware, software, firmware, or any combination thereof. For example, the method 400 may be performed by the processing circuitry 24 (or processing device) of the data communication system 10. Although shown in a particular sequence or order, unless otherwise specified, the order of the processes may be modified. Thus, the illustrated embodiments should be understood only as examples, and the illustrated processes may be performed in a different order, and some processes may be performed in parallel. Additionally, one or more processes may be omitted in various embodiments. Thus, not all processes are required in every embodiment. Other process flows are possible.

At operation 410, the processing logic generates multiple virtual addresses that are sequentially numbered for data that is to be at least one of processed or transferred in response to an input/output (I/O) request.

At operation 420, the processing logic allocates, for the data, a continuous range of physical addresses of a volatile memory of the computing system.

At operation 430, the processing logic generates a set of hash-based values based on respective physical addresses of the continuous range of physical addresses or based on mappings between the respective physical addresses and the multiple virtual addresses.

At operation 440, the processing logic identifies a unique cache line of the cache that corresponds to each respective hashed-based value of the set of hash-based values.

At operation 450, the processing logic causes the data to be directly stored in the unique cache lines of the cache. Here, "directly storing" indicates without first accessing the volatile memory to retrieve the data.

Figure 5:
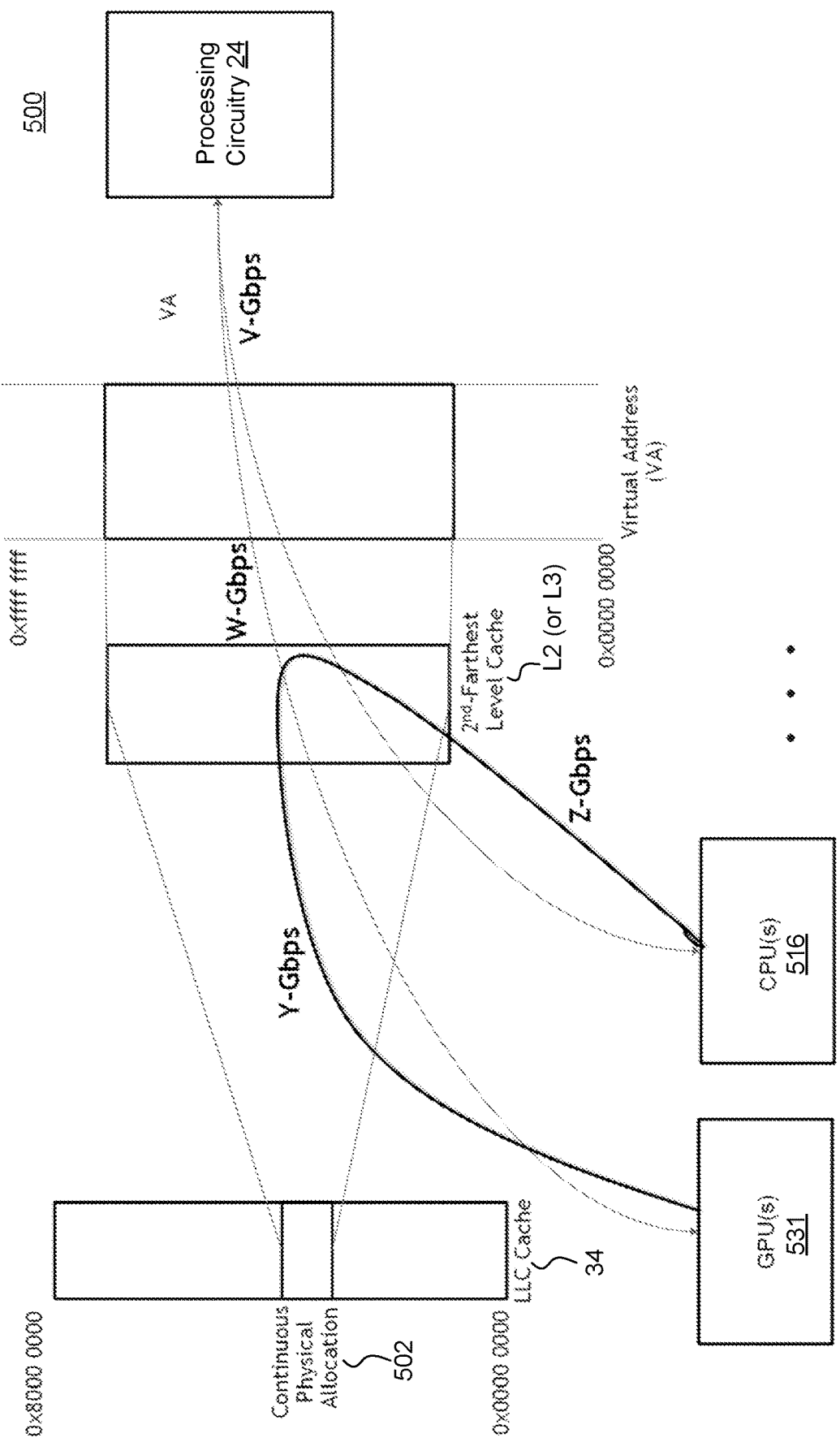
FIG. 5 is an operative data flow diagram in which data of the data communication system is routed directly through a second-highest level of cache from graphic processing units (GPUs) and/or central processing units (CPUs), without evicting data to volatile memory, based on the hash-based allocation of FIG. 2, in accordance with at least some embodiments.

FIG. 5 is an operative data flow diagram 500 in which data of the data communication system is routed directly through a second-highest level of cache from graphic processing units (GPUs) and/or central processing units (CPUs), without evicting data to volatile memory, based on the hash-based allocation of FIG. 2, in accordance with at least some embodiments. In these embodiments, the processing circuitry 24 (e.g., processing device) interacts with various levels of cache, including treating the cache 34 (e.g., LLC) as if it were the RAM 36 in the diagram 300 of FIG. 3 and treating the L2 (or L3) cache as if it were the cache 34 in the diagram 300 of FIG. 3. This shift in the cache location through which data flows without eviction to the LLC is made possible due to the I/O (or content transfer) requests coming from one or both of a graphics processing unit (GPU) 531 or a central processing unit (CPU) 516 that is located locally, e.g., as a part of the data communication system 10. In at least one embodiment, the CPU 516 is the same as the processing circuitry 24.

In these embodiments, the LLC or cache 34 is still referred to as the farthest level of cache from the processing device, and the L2 cache (or L3 cache if the LLC is L4 cache) is still referred to the second-farthest level of cache from the processing device, e.g., where the L2 (or L3) cache is coupled between the farthest level of cache and the processing device.

In these embodiments, the processing device (which includes at least a part of the processing circuitry 24) is configured to generate multiple virtual addresses that are sequentially numbered for data that is to be at least one of processed or transferred in response to an input-output (I/O) request from a CPU or a GPU. The processing device may further allocate, for the data, a continuous range of physical addresses 502 of the farthest level of cache (the LLC in this embodiment). The processing device may further generate a set of hash-based values based on one of the respective physical addresses or mappings between the multiple virtual addresses and respective physical addresses of the continuous range of physical addresses 502. The processing device may further identify a unique cache line of the second-farthest level of cache that corresponds to each respective hashed-based value of the set of hash-based values, and cause the data to be directly stored (e.g., without accessing the farthest level of cache) in the unique cache lines of the second-farthest cache. The processing device may further cause the data to be directly transferred (e.g., without accessing the LLC) to the CPU or the GPU that initiated the request.

In at least some embodiments, the farthest level of cache from the processing device is a third-level (L3) cache and the second-farthest level of cache from the processing device is a second-level (L2) cache. In at least other embodiments, the farthest level of cache from the processing device is a fourth-level (L4) cache and the second-farthest level of cache from the processing device is a third-level (L3) cache. In some embodiments, the processing device further changes the data stored in at least one of the unique cache lines without evicting the data to the farthest level of cache.

In some embodiments, the processing logic further receives second data that is to be at least one of processed or transferred in response to a second I/O request. The processing device may further assign the multiple virtual addresses to the second data while maintaining the set of hash-based values. The processing device may further cause the second data to be directly stored in the unique cache lines of the second-farthest cache.

Otherwise, in at least one embodiment, if allocating to a different continuous range of physical addresses, the processing device generates a new set of hash-based values based on the new respective physical addresses or based on mappings between the multiple virtual addresses and the new respective physical address. This new (or different) set of hash-based values can then be employed to identify a unique cache line for each respective virtual address of the multiple virtual addresses, effectively generating a new set of VA-to-cache line mappings to be used to index the second data within the second-farthest level of cache (e.g., L2 or L3 cache).

Figure 6:
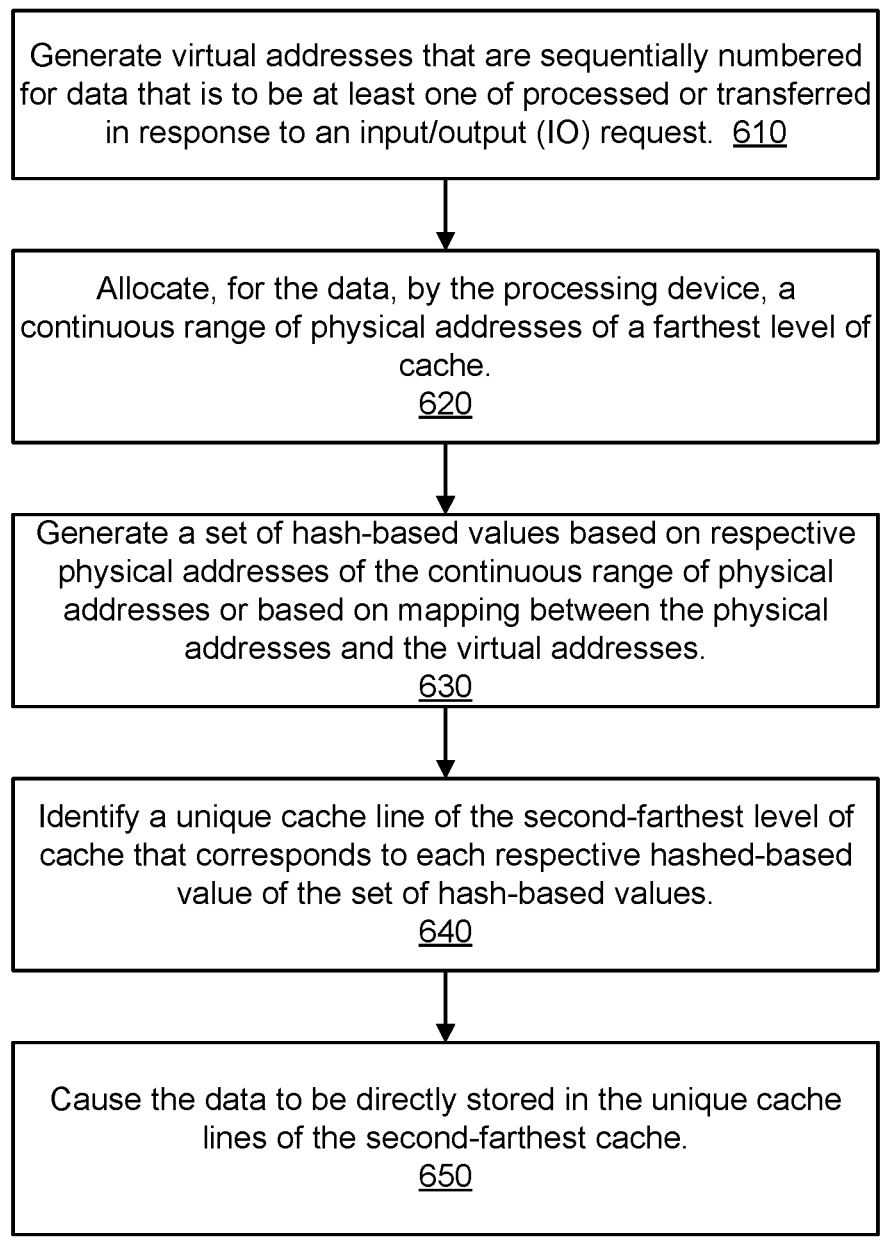
FIG. 6 is a flow diagram of a method for mapping VAs to the unique cache lines of FIG. 5 using the disclosed hash-based allocation, in accordance with at least some embodiments.

FIG. 6 is a flow diagram of a method 600 for mapping VAs to the unique cache lines of FIG. 5 using the disclosed hash-based allocation, in accordance with at least some embodiments. The method 600 may be performed by processing logic comprising hardware, software, firmware, or any combination thereof. For example, the method 600 may be performed by the processing circuitry 24 (or processing device) of the data communication system 10. Although shown in a particular sequence or order, unless otherwise specified, the order of the processes may be modified. Thus, the illustrated embodiments should be understood only as examples, and the illustrated processes may be performed in a different order, and some processes may be performed in parallel. Additionally, one or more processes may be omitted in various embodiments. Thus, not all processes are required in every embodiment. Other process flows are possible.

At operation 610, the processing logic generates multiple virtual addresses that are sequentially numbered for data that is to be at least one of processed or transferred in response to an input-output (I/O) request received from a CPU or a GPU. The CPU may be a CPU of at least one of the CPUs 516 (FIG. 5), and the GPU may be a GPU of at least one of the GPUs 531 (FIG. 5).

At operation 620, the processing logic allocates, for the data, a continuous range of physical addresses of the farthest level of cache. This can be the continuous range of physical addresses 502 in the LLC illustrated in FIG. 5.

At operation 630, the processing logic generates a set of hash-based values based on one of the respective physical addresses or mappings between the multiple virtual addresses and respective physical addresses of the continuous range of physical addresses.

At operation 640, the processing logic identifies a unique cache line of the second-farthest level of cache that corresponds to each respective hashed-based value of the set of hash-based values.

At operation 650, the processing causes the data to be directly stored in the unique cache lines of the second-farthest cache.

Other variations are within the scope of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device or a MACsec device. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a sub-system, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computing system comprising:
   a volatile memory;
   a cache coupled with the volatile memory; and
   a processing device coupled with the cache, the processing device coupled with at least one of a storage device or a network port and is to:
   generate a plurality of virtual addresses that are sequentially numbered for data that is to be at least one of processed or transferred in response to an input/output (I/O) request;
   allocate, for the data, a continuous range of physical addresses of the volatile memory, wherein the continuous range of physical addresses is limited to a size of the cache;
   generate a set of hash-based values based on mappings between the plurality of virtual addresses and respective physical addresses of the continuous range of physical addresses;
   identify a unique cache line of the cache that corresponds to each respective hashed-based value of the set of hash-based values; and
   cause the data to be directly stored in the unique cache lines of the cache.

2. The computing system of claim 1, wherein the cache is a farthest level of cache from the processing device, and wherein the processing device is further to cause the data to be directly transferred from the cache to at least one of the storage device or the network port.

3. The computing system of claim 2, wherein the processing device is further to:
   receive second data that is to be at least one of processed or transferred in response to a second I/O request;
   assign the plurality of virtual addresses to the second data while maintaining the set of hash-based values as being generated based on the mappings; and
   cause the second data to be directly stored in the unique cache lines of the cache.

4. The computing system of claim 1, wherein the processing device is further to change the data stored in at least one of the unique cache lines without evicting the data to the volatile memory and without pinning any of the plurality of virtual addresses.

5. The computing system of claim 1, wherein the cache is one of a third-level (L3) cache or a fourth-level (L4) cache.

6. The computing system of claim 1, wherein the allocation of the continuous range of physical addresses is non-coherent, and wherein a size of the continuous range of physical addresses matches a maximum possible size of the I/O request.

7. The computing system of claim 1, wherein the storage device is one of a network switch or a storage hub that manages one or more storage devices.

8. The computing system of claim 1, wherein, due to limiting the continuous range of physical addresses, each unique cache line maps to a unique physical address of the volatile memory.

9. A method comprising:
   generating, by a processing device coupled with a cache in a computing system, a plurality of virtual addresses that are sequentially numbered for data that is to be at least one of processed or transferred in response to an input/output (I/O) request;
   allocating, for the data, a continuous range of physical addresses of a volatile memory of the computing system, wherein the continuous range of physical addresses is limited to a size of the cache;
   generating, by the processing device, a set of hash-based values based on respective physical addresses of the continuous range of physical addresses;
   identifying, by the processing device, a unique cache line of the cache that corresponds to each respective hashed-based value of the set of hash-based values; and
   causing, by the processing device, the data to be directly stored in the unique cache lines of the cache.

10. The method of claim 9, wherein the cache is a farthest level of cache from the processing device, the method further comprising causing the data to be directly transferred from the cache to at least one of a storage device or a network port.

11. The method of claim 10, further comprising:
    receiving second data that is to be at least one of processed or transferred in response to a second I/O request;
    assigning the plurality of virtual addresses to the second data while maintaining the set of hash-based values based on the respective physical addresses; and
    causing the second data to be directly stored in the unique cache lines of the cache.

12. The method of claim 9, further comprising changing the data stored in at least one of the unique cache lines without evicting the data to the volatile memory and without pinning any of the plurality of virtual addresses.

13. The method of claim 9, wherein the cache is one of a third-level (L3) cache or a fourth-level (L4) cache.

14. The method of claim 9, wherein the allocating of the continuous range of physical addresses is non-coherent allocation, and wherein a size of the continuous range of physical addresses matches a maximum possible size of the I/O request.

15. The method of claim 9, wherein, due to limiting the continuous range of physical addresses, each unique cache line maps to a unique physical address of the volatile memory.

16. A computing system comprising:
   a processing device coupled with at least one central processing unit (CPU) and at least one graphics processing unit (GPU);
   a farthest level of cache from the processing device; and
   a second-farthest level of cache from the processing device coupled between the farthest level of cache and the processing device; and
   wherein the processing device is to:
      generate a plurality of virtual addresses that are sequentially numbered for data that is to be at least one of processed or transferred in response to an input-output (I/O) request received from the at least one CPU or the at least one GPU;
      allocate, for the data, a continuous range of physical addresses of the farthest level of cache, wherein the continuous range of physical addresses is limited to a size of the cache;
      generate a set of hash-based values based on one of respective physical addresses or mappings between the plurality of virtual addresses and respective physical addresses of the continuous range of physical addresses;
      identify a unique cache line of the second-farthest level of cache that corresponds to each respective hashed-based value of the set of hash-based values; and
      cause the data to be directly stored in the unique cache lines of the second-farthest cache.

17. The computing system of claim 16, wherein the farthest level of cache from the processing device is a third-level (L3) cache, and the second-farthest level of cache from the processing device is a second-level (L2) cache.

18. The computing system of claim 16, wherein the farthest level of cache from the processing device is a fourth-level (L4) cache, and the second-farthest level of cache from the processing device is a third-level (L3) cache.

19. The computing system of claim 16, wherein the processing device is further to:
   receive second data that is to be at least one of processed or transferred in response to a second I/O request;
   assign the plurality of virtual addresses to the second data while maintaining the set of hash-based values as being generated based on the one of respective physical addresses or mappings between the plurality of virtual addresses and respective physical addresses; and
   cause the second data to be directly stored in the unique cache lines of the second-farthest cache.

20. The computing system of claim 16, wherein the processing device is further to change the data stored in at least one of the unique cache lines without evicting the data to the farthest level of cache.

21. The computing system of claim 16, wherein the processing device is further to cause the data to be directly transferred from the cache to the at least one CPU or the at least one GPU that initiated the request.

* * * * *